(12) United States Patent
Wang et al.

(10) Patent No.: US 9,859,780 B2
(45) Date of Patent: Jan. 2, 2018

(54) VIBRATION MOTOR

(71) Applicants: Hongxing Wang, Shenzhen (CN);
Lubin Mao, Shenzhen (CN)

(72) Inventors: Hongxing Wang, Shenzhen (CN);
Lubin Mao, Shenzhen (CN)

(73) Assignee: AAC TECHNOLOGIES PTE. LTD.,
Singapore (SG)

( * ) Notice: Subject to any disclaimer, the term of this patent is extended or adjusted under 35 U.S.C. 154(b) by 193 days.

(21) Appl. No.: 15/062,098

(22) Filed: Mar. 5, 2016

(65) Prior Publication Data

US 2017/0033673 A1 Feb. 2, 2017

(30) Foreign Application Priority Data

Jul. 31, 2015 (CN) .................... 2015 2 0570828 U

(51) Int. Cl.
*H02K 33/00* (2006.01)
*H02K 5/24* (2006.01)
*H02K 5/04* (2006.01)
*H02K 33/16* (2006.01)

(52) U.S. Cl.
CPC .................... *H02K 33/16* (2013.01)

(58) Field of Classification Search
CPC ............ H02K 33/16; H02K 5/08; H02K 7/04
USPC ................... 310/15, 25, 36, 51, 81
See application file for complete search history.

(56) References Cited

U.S. PATENT DOCUMENTS

| 2011/0001365 A1* | 1/2011 | Park | H02K 33/16 |
| | | | 310/17 |
| 2011/0012441 A1* | 1/2011 | Oh | B06B 1/045 |
| | | | 310/25 |
| 2011/0062804 A1* | 3/2011 | Lee | H02K 33/18 |
| | | | 310/30 |
| 2011/0101796 A1* | 5/2011 | Odajima | H02K 33/16 |
| | | | 310/25 |
| 2013/0200732 A1* | 8/2013 | Jun | H02K 33/00 |
| | | | 310/25 |

* cited by examiner

*Primary Examiner* — Jose Gonzalez Quinones
(74) *Attorney, Agent, or Firm* — Na Xu; IPro, PLLC

(57) ABSTRACT

A vibration motor includes a first vibrator, a second vibrator and a fixing member having a part located between the first and second vibrators. The first and second vibrators are suspended by a number of guiding members each having a guide and a spring wound around the guide. The first and second vibrators are capable of vibrating along two perpendicular directions.

6 Claims, 3 Drawing Sheets

VIBRATION MOTOR

FIELD OF THE DISCLOSURE

The present disclosure generally relates to vibration motors, and more particularly to a vibration motor used in a portable consumer electronic device.

BACKGROUND

With the development of the electronic technologies, portable consumer electronic devices are more popular and desired by people. A portable consumer electronic device, such as a wireless communication device, generally includes a vibration motor sued for generating tactile feedback.

Typically, flat linear vibration motors are commonly used. A flat linear vibration motor includes an elastic member, a vibration unit suspended by the elastic member, and a housing for accommodating the elastic member and the vibration unit therein. The elastic member is generally welded to the vibration unit. Such a vibration motor only has one resonant frequency, at which the vibration motor has maximum vibration amplitude. For some certain applications, the vibration motor needs two resonant frequencies for performing desired requirements. Such a typical vibration motor, as described in JP Publication No. 1993-85192, cannot satisfy the requirements.

For this reason, it is necessary to provide a novel vibration motor to overcome the shortcomings above.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and exemplary embodiments thereof.

Figure 1:
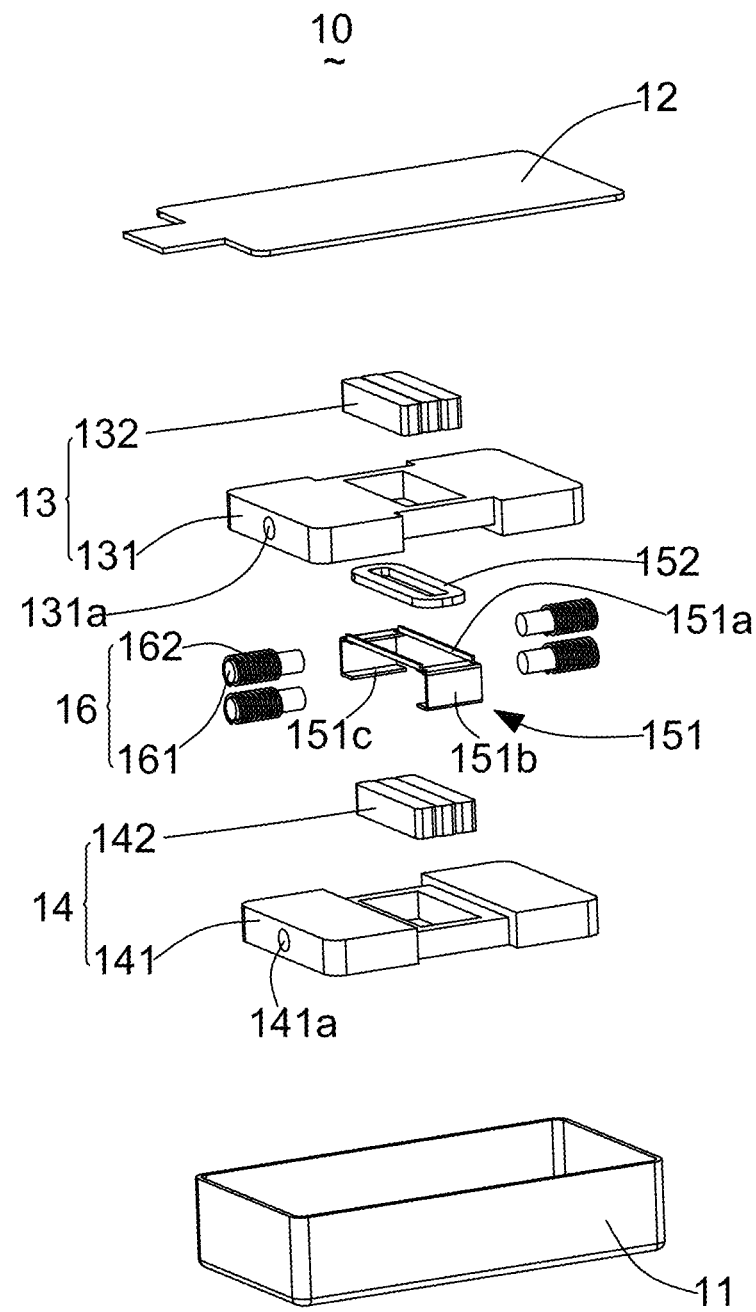
FIG. 1 is an isometric and exploded view of a vibration motor in accordance with a first exemplary embodiment of the present disclosure.
Figure 2:
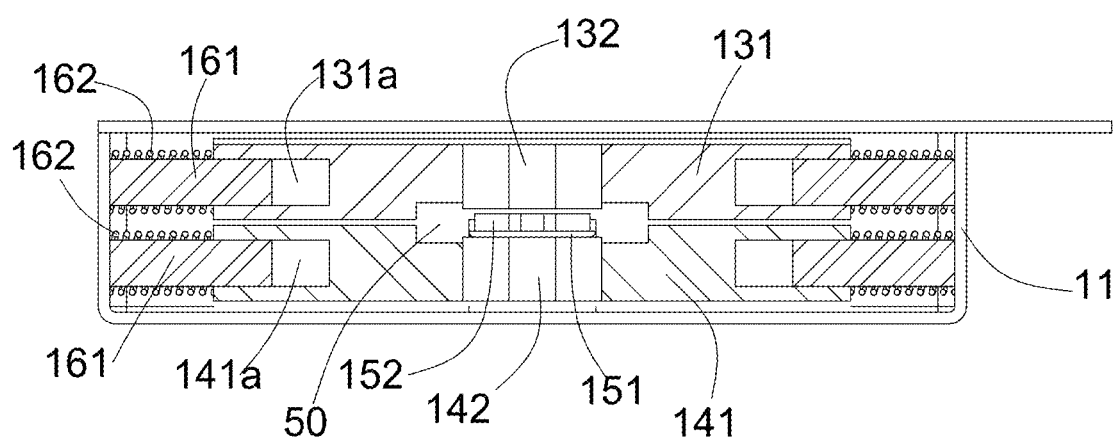
FIG. 2 is a cross-sectional view of the vibration motor in FIG. 1.

Referring to FIGS. 1-2, a vibration motor 10, in accordance with a first embodiment of the present disclosure, comprises a cover 11, a substrate 12 forming an accommodation space together with the cover 11, a first vibrator 13 accommodated in the accommodation space, a second vibrator 14 opposed to and keeping a distance from the first vibrator 13, and a plurality of guiding members 16 for suspending the first and second vibrators 13, 14 in the accommodation space.

The first vibrator 13 includes a first weight 131 and a first driver 132 assembled with the first weight 131. In this embodiment, the first weight 131 is provided with a through hole and the first driver 132 is received in the through hole. The first weight 131 further includes a first guiding slot 131a. Similarly, the second vibrator 14 includes a second weight 141 and a second driver 142 assembled with the second weight 141. The second weight further includes a second guiding slot 141a. In this embodiment, the second weight 141 is provided with a through hole and the second driver 142 is received in the through hole.

The fixing member 15 includes a support 151 and a third driver 152 carried by the support 151. The guiding member 16 comprises a guide 161 and a spring wound around the guide 161.

When assembled, one end of one of the guides 161 is positioned on the cover 11 and the other end of the guide 161 is partially received in the first guiding slot 131a, and one end of the corresponding spring 162 is positioned on the cover 11 and the other end of the corresponding spring 162 is abutting against an edge of the first weight 131. Thus, the first vibrator 13 is supported and suspended by the guide 161, and the spring 162 provides the first vibrator 13 with restore force. By virtue of such a configuration, the first vibrator 13 is capable of vibrating along the guide 161. Similarly, one end of one of the guides 161 is positioned on the cover 11 and the other end of the guide 161 is partially received in the second guiding slot 141a, and one end of the corresponding spring 162 is positioned on the cover 11 and the other end of the corresponding spring 162 is abutting against an edge of the second weight 141. Thus, the second vibrator 14 is supported and suspended by the guide 161, and the spring 162 provides the second vibrator 13 with restore force. By virtue of such a configuration, the second vibrator 13 is capable of vibrating along the guide 161. The first vibrator 13 is opposed to and keeping a distance from the second vibrator 14 for forming a gap 50 therebetween. For describing the structure clearly, it is hereby defined that the guiding member suspending the first vibrator is the first guiding member, and correspondingly, the guide and the spring of the first guiding member is defined as the first guide and the first spring. And, the guiding member suspending the second vibrator is the second guiding member, and correspondingly, the guide and the spring of the second guiding member is defined as the second guide and the second spring.

The support 151 of the fixing member 15 comprises a top 151a for carrying the third driver 152, a side 151b extending substantially vertically to the top 151a, and a bottom 151c extending particularly to the side 151b. The bottom 151c is assembled with the cover 11. A height of the side 151b is such configured that the top 151a and the third driver 152 is located in the gap 50, and the third driver 152 is located right between the first driver 132 and the second driver 142. The interaction between the first driver 132 and the third driver 152 drives the first vibrator 13 to vibrate along the fixing member 16 assembled with the first driver 13. The interaction between the second driver 142 and the third driver 152 drives the second vibrator 14 to vibrate along the fixing member 16 assembled with the second vibrator 14. The first driver 13 is same to the second driver 14. In this embodiment, the first and the second drivers are magnets, and the third driver 152 is a coil. The magnet and the coil cooperatively produce Ampere Force which serves as driving force to drive the first or second vibrator to vibrate. Alternatively, the first and second drivers are coils and the third driver is a magnet.

As shown in FIGS. 1-2, each of the vibrators is provided with two guiding members configured to be disposed at two sides of the corresponding vibrator.

Figure 3:
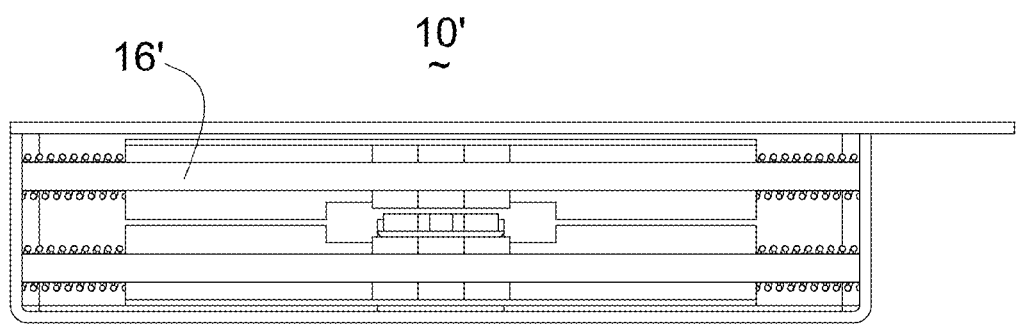
FIG. 3 is a cross-sectional view of a vibration motor in accordance with a second exemplary embodiment of the present disclosure.

Referring to FIG. 3, a vibration motor 10', in accordance with a second exemplary embodiment of the present disclosure, is similar to the vibration motor in the first embodiment. The difference between the second embodiment and the first embodiment is that each of the vibrators is provided with one guiding member 16' penetrating the corresponding vibrator. Two ends of each guiding member 16' are disposed out of the corresponding vibrator. Another word, the guiding slot is a through hole penetrating completely through the corresponding vibrator.

While the third driver, i.e., the coil is electrified, the interaction between the coil and the first driver (the magnet) will drive the first vibrator to vibrate along its vibration direction, i.e. along the guide. And the interaction between the coil and the second driver (the magnet) will drive the second vibrator to vibrate along the guide. In the embodiments disclosed above, the guides supporting the first and second vibrators are parallel to each other, therefore, the first and second vibrators are capable of vibrating along parallel directions. In fact, the guides supporting the first and second vibrators can be configured to be perpendicular to each other, and the vibration directions of the first and second vibrators are perpendicularly to each other. Optionally, if the coil is electrified by a signal having a predetermined frequency that is same to a resonance frequency of the first vibrator, the first vibrator will vibrate with maximum amplitude. Similarly, if the coil is electrified by a signal having a predetermined frequency that is same to a resonance frequency of the second vibrator, the second vibrator will vibrate with maximum amplitude.

Figure 4:
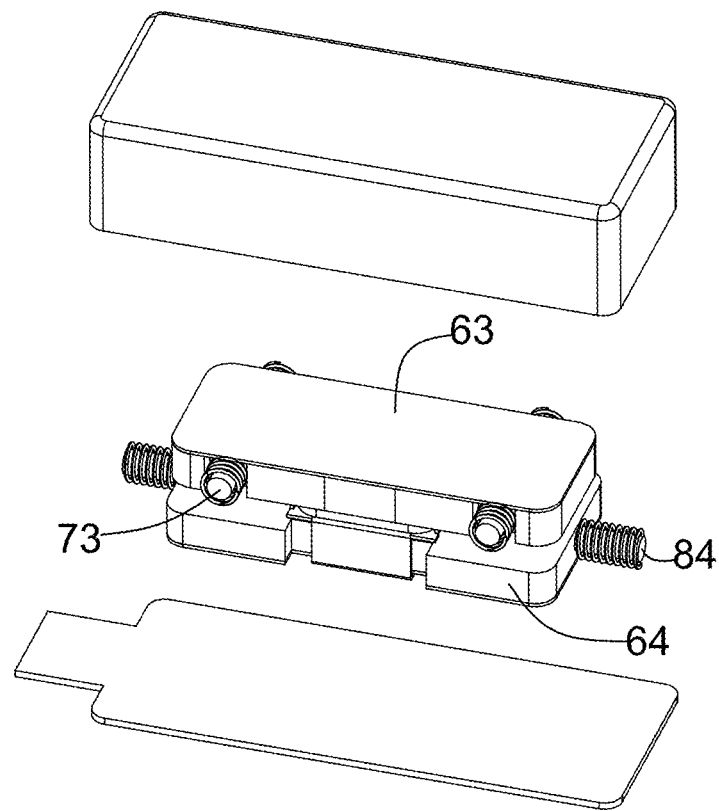
FIG. 4 is an isometric and exploded view of a vibration motor in accordance with a third embodiment of the present disclosure.
Figure 5:
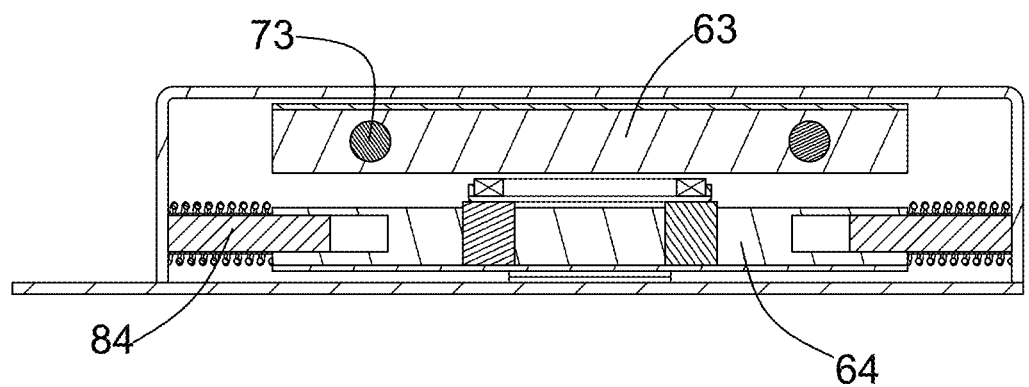
FIG. 5 is a cross-sectional view of the vibration motor in FIG. 4.

Referring to FIGS. 4-5, a vibration motor in accordance with a third embodiment of the present disclosure is similar to the first embodiment. The difference between the third embodiment and the first embodiment is that, in the third embodiment, the first guiding member 73 of the first vibrator 63 is configured to be perpendicular to the second guiding member 84 of the second vibrator 64, while in the first embodiment, the first guiding member is parallel to the second guiding member. Thus, the first vibrator 63 is capable of vibrate along the first guiding member 73, and the second vibrator 64 is capable of vibrating along the second guiding member 84 that is perpendicular to the first guiding member 73.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:
a cover;
a substrate forming an accommodation space together with the cover;
a first vibrator accommodated in the accommodation space, the first vibrator having a first weight and a first driver assembled with the first weight;
a second vibrator accommodated in the accommodation space, the second vibrator having a second weight and a second driver assembled with the second weight;
a fixing member assembled with the cover and having a third driver located between the first and second drivers for producing an interaction between the first driver and the third driver for driving the first vibrator along a first direction, and for producing an interaction between the second driver and the third driver for driving the second vibrator along a second direction perpendicularly to the first direction.

2. The vibration motor as described in claim 1, wherein the first driver is a magnet assembled with the first weight, the second driver is a magnet assembled with the second weight, and the third driver is a coil.

3. The vibration motor as described in claim 1, wherein the first driver is a coil assembled with the first weight, the second driver is a coil assembled with the second weight, and the third driver is a magnet.

4. The vibration motor as described in claim 1, wherein the fixing member includes a top for carrying the third driver, a side extending substantially vertically from the top, and a bottom extending particularly to the side and fixed to the cover or the substrate.

5. The vibration motor as described in claim 1 further including a first guiding member including a first guide with one end connected to the cover and another end received in a first guiding slot of the first vibrator, and a first spring having one end assembled with the cover and another end attached to the first vibrator, the first spring wound around the first guide.

6. The vibration motor as described in claim 5 further including a second guiding member perpendicular to the first guiding member, the second guiding member including a second guide with one end connected to the cover and another end received in a second guiding slot of the second vibrator, and a second spring having one end assembled with the cover and another end attached to the second vibrator, the second spring wound around the second guide.

* * * * *